Sept. 22, 1964   A. M. MAIO   3,149,820
GAS TURBINE SPEED CONTROL
Filed June 28, 1961   4 Sheets-Sheet 1

INVENTOR.
ANTHONY M. MAIO
BY
Lockwood, Woodard, Smith & Weikart
Attorneys

Sept. 22, 1964     A. M. MAIO     3,149,820
GAS TURBINE SPEED CONTROL
Filed June 28, 1961     4 Sheets-Sheet 2

INVENTOR.
ANTHONY M. MAIO
BY
Lakewood, Woodard, Smith & Weikart
Attorneys

Sept. 22, 1964  A. M. MAIO  3,149,820
GAS TURBINE SPEED CONTROL
Filed June 28, 1961  4 Sheets-Sheet 3

INVENTOR.
ANTHONY M. MAIO
BY
Lockwood, Woodard, Smith & Weikart
Attorneys

Sept. 22, 1964     A. M. MAIO     3,149,820

GAS TURBINE SPEED CONTROL

Filed June 28, 1961     4 Sheets-Sheet 4

INVENTOR.
ANTHONY M. MAIO
BY
*Lockwood, Woodard, Smith & Weikart*
Attorneys

United States Patent Office 3,149,820
Patented Sept. 22, 1964

3,149,820
GAS TURBINE SPEED CONTROL
Anthony M. Maio, Indianapolis, Ind., assignor to Silencer Manufacturing, Inc., Indianapolis, Ind., a corporation of Indiana
Filed June 28, 1961, Ser. No. 120,433
2 Claims. (Cl. 253—52)

This invention relates generally to turbines and more particularly to a means for varying or controlling the speed of a gas turbine.

This invention is considered to be an improvement over the structure disclosed and claimed in United States Patent 2,958,506 issued November 1, 1960, to Charles Chimento, titled "Turbine Muffler," and assigned to the assignee of the present invention. In the aforementioned patent a structure is disclosed and claimed wherein a terminal segment of a vortex tube is pivotally moved toward and away from the turbine rotor to control its speed. The structure of the present invention is intended to perform the same function, however, in place of the movement of the terminal end of a vortex tube, the position of a movable wall extending substantially around the peripheral area of the rotor is moved in response to a controll signal. The arrangement of the structure of the present invention might be applied to a turbine whose function is to dissipate the energy of internal combustion engine exhaust gases, thus muffling the engine, as disclosed in the above mentioned Chimento patent or might be applied to turbines intended for attachment to blowers or other power absorbing devices wherein control of the turbine rotor speed is desirable.

The primary object of the present invention is to provide a structure for attaining accurate, programmed speed control of turbines of various types.

A further object of the present invention is to provide a speed control of the type referred to above which is of relatively simple and trouble-free construction.

These and other objects will become apparent as the description proceeds with reference to the accompanying drawings in which.

Figure 1:
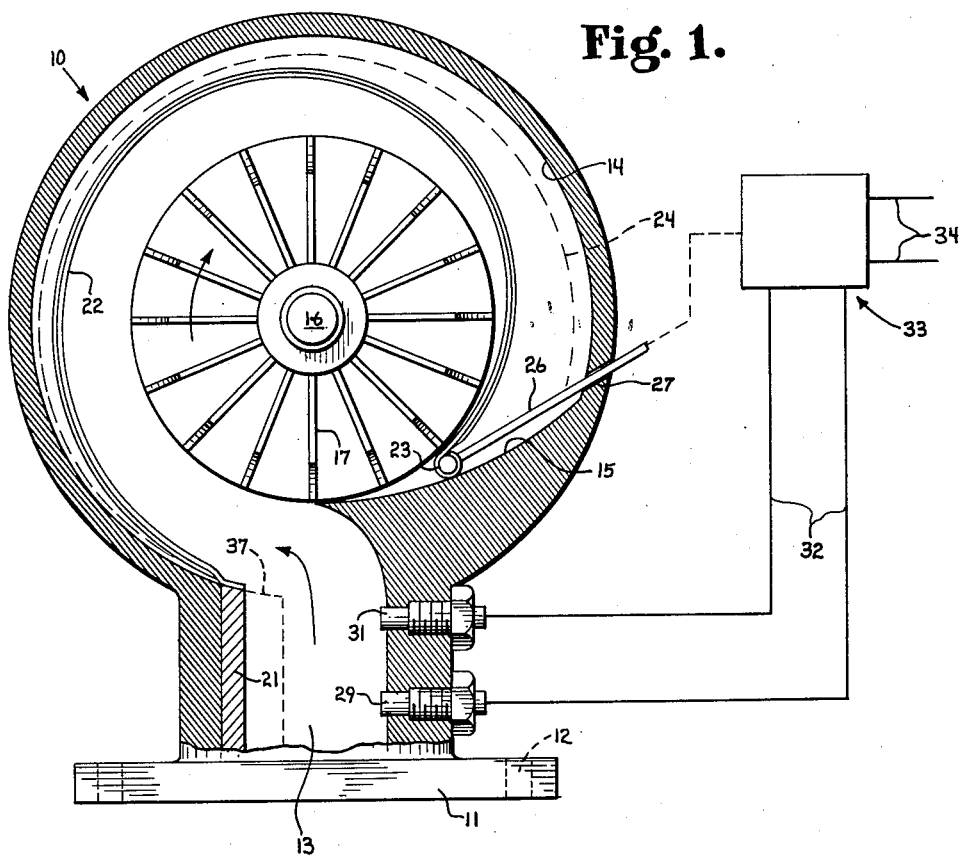
FIG. 1 is a side view, partially in section, of a turbine embodying the present invention, portions of the control means being shown in schematic form.
Figure 2:
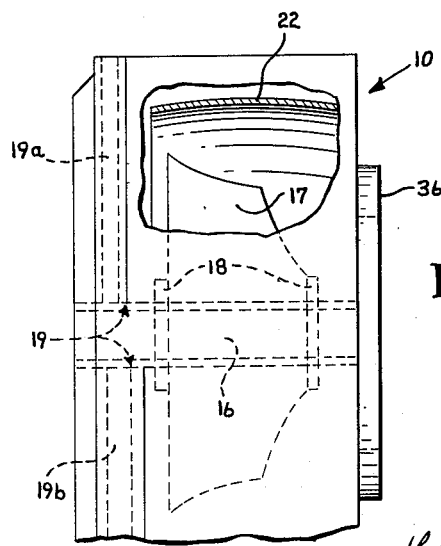
FIG. 2 is a side view, partially in section, showing a portion of the turbine of FIG. 1.

Referring initially to FIGS. 1 and 2, there is shown generally at 10 a turbine housing having an inlet flange 11 provided with threaded apertures 12 and being thereby adapted for mounting on, for example, the exhaust manifold of an internal combustion engine. The housing is formed of a castable, high nickel content metal. In casting the housing, the housing is cored so as to provide a generally circular internal surface 14 which merges with an arcuate internal surface 15. The housing is further cored to provide an inlet opening 13 which communicates with the interior of the housing.

Extending centrally through the housing and journaled therein is a turbine rotor shaft 16 which supports turbine blades 17. The blades are maintained on the shaft by means of thrust plates 18, and the shaft is provided with conventional oil passages indicated generally at 19 in FIG. 2. A radial passage 19a in the housing communicates with the passages 19 and is adapted to have connected thereto a line leading from a source of pressurized lubricating oil. A passage 19b in the housing, communicating with the passages 19 serves to return the lubricating oil to the intake side of the pressurized oil supply (not shown).

Rigidly attached to the adjacent housing 10 by any suitable means is a member 21 (FIG. 1) which forms a part of the wall defining the inlet opening or passage 13. Rigidly attached by welding or other suitable means to the upper end of the member 21 is a relatively thin flexible strip 22, preferably formed of spring steel. The strip 22 extends within the housing in spaced relation to the periphery of the blades 17 and the free end 23 of the strip rests upon the surface 15 formed in the housing. From FIG. 1 it will be apparent that the strip 22 forms a movable wall extending within the housing in spaced relation to the periphery of the rotor formed by the blades 17. As shown in FIG. 1 the strip 22 is in its fully closed position, that is, in a position wherein its spacing from the periphery of the rotor is at a minimum. As the movable wall formed by the strip 22 is moved outwardly to its broken line position indicated at 24 in FIG. 1, it will be understood that the speed of movement of the gases moving through the turbine, and consequently the speed of rotation of the turbine rotor, will decrease exponentially with relation to the movement of the strip 22 toward full open position. While movement of strip 22 can be used to vary the speed of the turbine rotor, it will be understood that this movement can also be utilized to hold the turbine rotor speed constant or to set the turbine speed according to a predetermined schedule against input parameters of, for example, temperature and pressure.

The terminal or free end of the strip 22 has pivotally secured thereto a control arm 26 which extends through an aperture 27 in the housing and shifting of the control arm 26 along its axis serves to displace the movable wall formed by the strip 22 as will be evident from FIG. 1.

The position of the control arm 26, and therefore the position of the movable wall formed by the strip 22, is here shown as established as a function of the pressure and temperature of the gases entering the turbine. The means for positioning the control arm may take any suitable conventional form. Since the positioning motor or actuating device per se does not form a part of the present invention, it is disclosed only schematically herein.

The housing 10 may be provided with tapped apertures which accommodate the pressure sensing means 29 and the temperature sensing means 31, these being connected by means of suitable wiring 32 to a modulating control indicated schematically at 33. The pressure and temperature sensing means are of conventional type and may take the form of a standard S.A.E. pressure sensing probe and a standard S.A.E. high temperature thermocouple as listed in S.A.E. Engineering Specifications. Electrical power input to the control 33 may be supplied by wires 34 which may be connected to a conventional source of electrical power. It will be understood that other forms of actuators for the control arm might be utilized and that parameters other than pressure and temperature might be utilized to determine the position of the control arm 26. Where the turbine embodying the apparatus of the present invention is used as a muffler for the exhaust gases of an internal combustion engine, control of the turbine speed as a direct function of temperature and pressure of the engine exhaust gases entering the turbine provide the proper muffling effect.

In operation, where the turbine embodying the apparatus of the present invention is to be utilized as a muffler, the turbine inlet may be connected to the exhaust manifold of an internal combustion engine and the exhaust flange 36 (FIG. 2) may be connected to a suitably formed exhaust pipe or conduit. The engine exhaust gases pass through the turbine housing and are delivered to the blades of the turbine rotor causing it to rotate as indicated in FIG. 1. Upon initial starting of the engine the exhaust gas pressure and temperature are at minimum value and the movable wall formed by the strip 22 is positioned by the control arm in its maximum closed position. As the engine speed is increased, the control arm is moved so as to position the movable wall further toward its open position. The effect of this motion or displacement of the movable wall is to maintain the speed of the turbine rotor relatively constant and independent of changes in engine speed. Rotation of the rotor serves to segregate the exhaust gases into minute increments. The energy of the exhaust gases is thus spent, thereby providing the engine muffling effect.

In order that a turbine embodying the apparatus of the present invention may be utilized to function with a range of engine sizes, the throat or inlet passage 13 may be varied in cross-sectional area by utilizing members 21 of various thicknesses. This alternative use of variously sized members 21 is illustrated by broken lines at 37 in FIG. 1.

Figure 3:
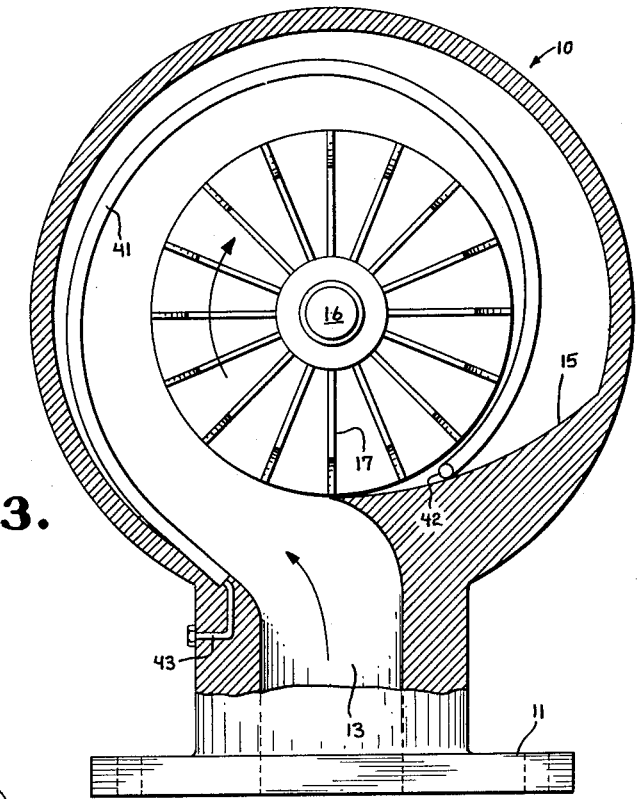
FIG. 3 is a side view, partially in section, of a turbine embodying a modified form of the present invention.

Referring to FIG. 3, there is shown a modified form of the movable wall referred to with reference to FIG. 1 and incorporated into a turbine of substantially the same structure as that of the turbine of FIG. 1. Parts of the turbine rotor and housing of FIG. 3 are given the same reference numerals as in FIG. 1 since they are substantially identical. Rigidly secured by soldering, welding or other suitable means to the inner face of the housing adjacent the inlet passage 13 is a Bourdon tube 41 whose free end 42 rests lightly upon the surface 15 of the housing. The Bourdon tube 41 forms the movable wall about the turbine rotor and is a curved, blind elastic tube having the characteristic oval cross-section. Variations in pressure within the tube causes the characteristic anticlastic bending of the tube to vary the spacing between the inner wall of the tube and the periphery of the turbine rotor. The open end of the tube communicates with a suitably formed passage 43 in the housing 10, the passage 43 being adapted to receive a control air pressure line.

It will be understood that the operation of the apparatus shown in FIG. 3 is substantially the same as that shown in FIG. 1 except that the movable wall formed by the Bourdon tube 41 is positioned with relation to the turbine rotor as a function of the control air pressure introduced within the tube. An increase in pressure within the tube 41 results in an outward movement of the tube and consequently a reduction in the speed of the turbine rotor.

Figure 6:
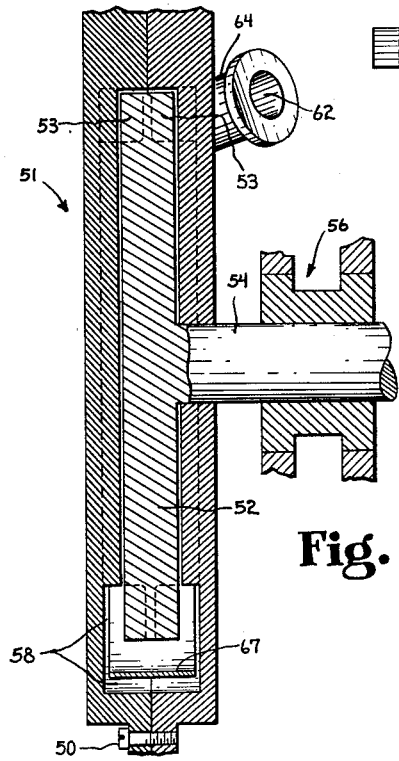
FIG. 6 is a sectional view taken generally along the line 6—6 of FIG. 4.
Figure 4:
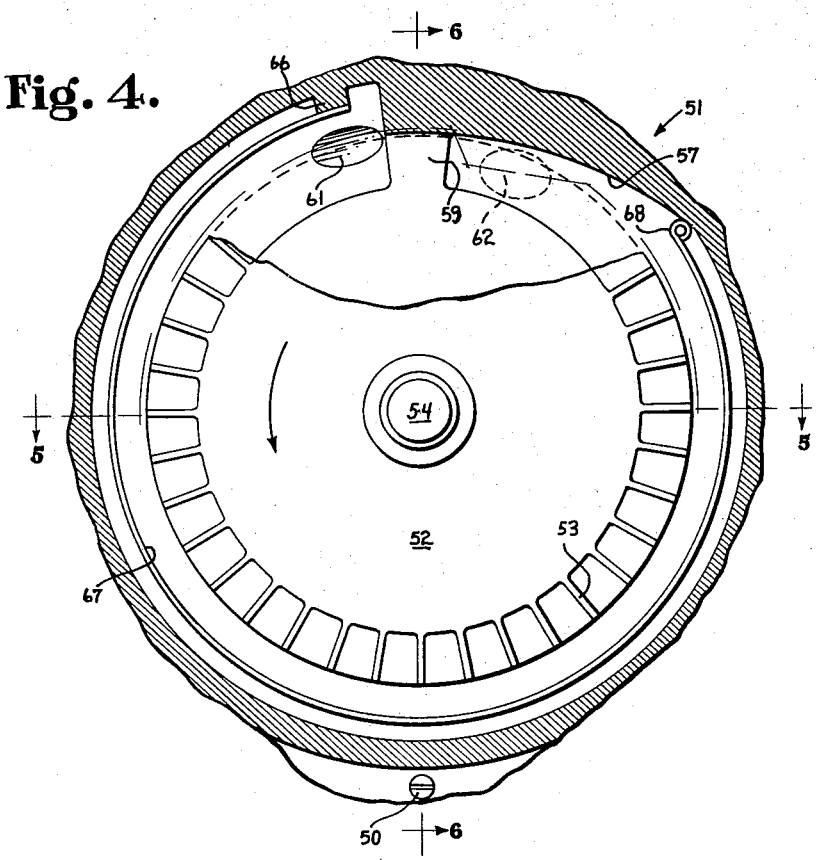
FIG. 4 is a side sectional view of a different type of turbine embodying the structure of the present invention.
Figure 5:
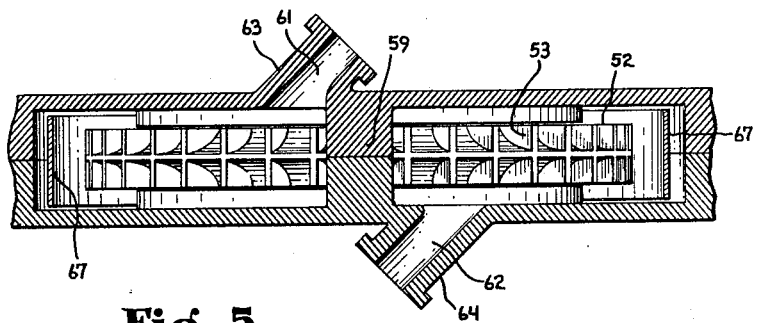
FIG. 5 is a sectional view taken generally along the line 5—5 of FIG. 4.

Referring now to FIGS. 4, 5 and 6, the application of the movable wall arrangement previously described will now be referred to with relation to a relatively simple drag type turbine. The turbine includes a two-piece housing 51 joined by bolts 50 (FIG. 4), the pertinent portion of which is shown in FIG. 4. The housing accommodates a rotor 52, which as may best be seen in FIG. 6 is formed at its periphery to provide a series of blades 53. The turbine rotor shown is of the double sided type in which blades 53 extend from both sides of the peripheral portion of the rotor 52. As may best be seen in FIG. 6, the rotor is carried on the end of a shaft 54 which extends through a suitable aperture in the housing 51 and is supported by a bearing such as that indicated at 56. A portion of the housing side wall enclosing the turbine rotor is flattened as indicated at 57, this flattened portion being comparable with the housing surface 15 of FIGS. 1 and 3.

The housing cavity enclosing the turbine rotor is enlarged adjacent the rotor periphery as indicated at 58 in FIG. 6. A splitter seal or wall, indicated at 59 in FIG. 4, narrows the housing cavity down to a line closely adjacent the rotor periphery. This splitter seal or wall 59 serves to separate the inlet port or passage 61 from the exhaust port or passage 62. The inlet passage 61 extends through a suitably formed neck 63 which is flanged so as to be adapted for connection to the gases which are to operate the turbine. Similarly, the exhaust port or passage 62 extends through a neck 64 which is adapted to exhaust the spent gases from the turbine.

Welded or otherwise suitably rigidly secured to a boss 66 (FIG. 4) is a flexible strip 67 having substantially the same characteristics as the strip 22 of FIG. 1. The free end 68 of the strip 67 rides along the surface 57 as the movable wall formed by the strip is displaced. Any suitable means such as the control rod 26 of FIG. 1 and the accompanying actuating means might be utilized to position the free end of the strip 67 and consequently the movable wall formed by the strip with relation to the turbine rotor. It will be further understood that the strip 67 might be replaced by the Bourdon tube illustrated in FIG. 3, that is, the drag type turbine illustrated in FIG. 4 might also utilize a movable wall formed by a Bourdon tube such as illustrated in FIG. 3 with the position of the wall being a function of the control air pressure introduced into the tube. The present invention is intended to include such arrangements within its scope.

Figure 7:
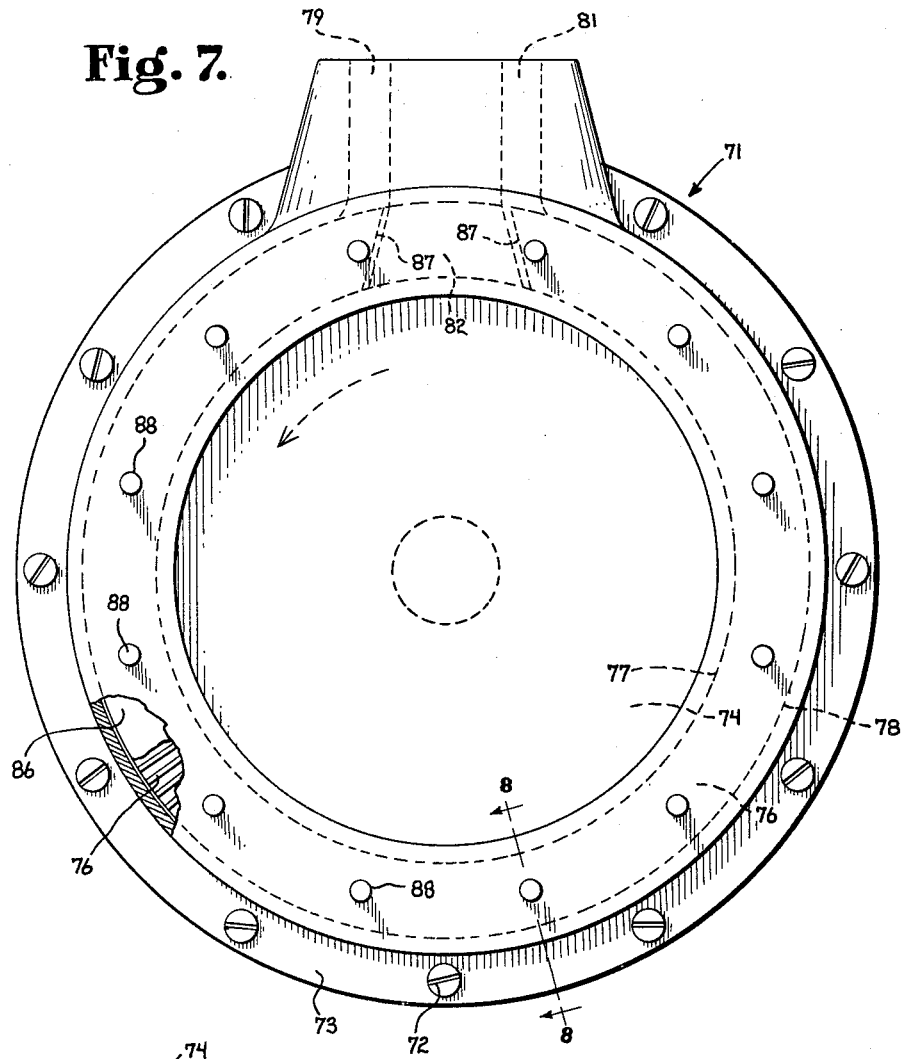
FIG. 7 is a side view, similar to FIG. 4, of a further modified form of the present invention.

FIG. 7 illustrates a further modified form of the present invention applied to a single sided drag type turbine. In FIG. 7 parts having substantial identical counterparts in FIG. 6 are given the same reference numerals as in FIG. 6. The housing 71 is similar to the housing of FIGS. 4, 5 and 6 in that it is composed of a two-piece arrangement with the housing halves bolted together by means of bolts 72 disposed at spaced points along the flange 73. As may best be seen in FIG. 8, the turbine wheel 74 is mounted on the shaft 54 and has a series of spaced, radially extending blades 76 disposed at one peripheral, side marginal area of the wheel. Reference numeral 77 in FIG. 7 identifies a broken line which indicates the junction of the blade 76 and the wheel 74 at the area of maximum length of the blades. In FIG. 7 the broken line 78 identifies the peripheral margin of the blades.

The upper area of the housing extends outwardly to provide an inlet port 79 and an outlet or exhaust port 81 and these are separated within the turbine by means of the splitter seal or wall 82. As is conventional in such turbine construction, the input gases enter the inlet port 79 and move through the turbine blade area, exiting at the exhaust port 81. In their movement through the turbine the gases cause the rotation of the turbine wheel in a counterclockwise direction as viewed in FIG. 7.

Figure 8:
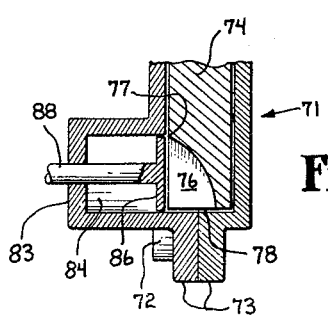
FIG. 8 is a fragmentary sectional view taken generally along the line 8—8 of FIG. 7.

As will be evident from FIGS. 7 and 8 one of the housing components is flanged outwardly as indicated at 83 to provide a circular cavity 84 (FIG. 8) adjacent the blades 76. The movable wall for controlling the turbine speed, the movable wall being the counterpart of the strip 67 of FIG. 4, is formed by an arcuate member 86 which extends around the inner margin of the cavity 84 adjacent the turbine wheel blade 76. The terminal ends of the arcuate member 86 are indicated at 87 in FIG. 7.

The arcuate member 86, forming the movable wall, is supported and moved by means of a series of actuating rods 88 which extend through appropriately spaced apertures in the flanged portion 83 of the housing component. The actuating rods may be positioned by any suitable control means and might utilize the modulating control arrangement indicated at 33 in FIG. 1.

In operation, the movable wall formed by the arcuate member 86 will be positioned by a control member responsive to such parameters as pressure and temperature of the incoming gases to control the speed of the turbine wheel as a function of the magnitude of the selected parameters.

From the foregoing it will be evident that the arrangement forming the subject matter of the present invention provides a means for controlling the speed of a turbine by means of a movable wall. While the invention has been described herein as actuated in response to the pressure and temperature of the inlet gases to hold a constant turbine rotor speed, it will be understood that the movable wall might be positioned in response to any predetermined schedule so that the turbine speed is controlled in accord with such schedule.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a turbine comprising a bladed rotor mounted for rotation in a housing with the housing having an inlet opening adapted to receive gases having substantial kinetic energy and an outlet opening for discharging spent gases, the combination of a movable wall formed by a Bourdon tube rigidly secured at one of its ends adjacent the housing inlet opening and extending within the housing in spaced relation to the periphery of the rotor, the free end of said tube being movable toward and away from the periphery of said rotor in response to static pressure variation within said tube to flex said tube thereby varying the spacing of the movable wall formed by said tube with relation to the rotor periphery, and means communicating with the interior of said tube adapted to introduce static pressure variations in said tube for positioning the movable wall formed by said tube to control the speed of the turbine rotor.

2. In a turbine comprising a rotor mounted for rotation in a housing with the housing having an inlet opening adapted to receive gases having substantial kinetic energy and an outlet opening for discharging spent gases, the combination of a movable wall formed by a Bourdon tube rigidly secured at one of its ends adjacent the housing inlet opening and extending within the housing in spaced relation to the periphery of said rotor, the free end of said tube being movable toward and away from the periphery of said rotor in response to static pressure variation within said tube to flex said tube thereby varying the spacing of the movable wall formed by said tube with relation to the rotor periphery.

References Cited in the file of this patent

UNITED STATES PATENTS

| 106,958 | Place | Aug. 30, 1870 |
| 1,415,981 | Bouche | May 16, 1922 |
| 1,955,683 | Reiffenstein | Apr. 17, 1934 |
| 2,026,436 | Reiffenstein | Dec. 31, 1935 |
| 2,205,902 | McMahan | June 25, 1940 |
| 2,323,941 | Smith | July 13, 1943 |
| 2,958,506 | Chimento | Nov. 1, 1960 |

FOREIGN PATENTS

| 621,254 | Canada | May 30, 1961 |
| 569,171 | Germany | Feb. 1933 |
| 5,303 | Great Britain | Mar. 2, 1912 |
| 397,752 | Great Britain | Aug. 31, 1933 |
| 31,628 | Netherlands | Sept. 26, 1930 |
| 221,512 | Switzerland | Aug. 17, 1942 |

OTHER REFERENCES

German application, 1,104,525, Apr. 13, 1961.